United States Patent
Lichti et al.

(10) Patent No.: US 7,025,191 B2
(45) Date of Patent: Apr. 11, 2006

(54) MOVING CRANK MECHANISM

(76) Inventors: Robert D. Lichti, 15941 W. Clear Canyon Dr., Suprise, AZ (US) 85374; Wayne Lichti, 100 Chester Airport Rd., P.O. Box 1489, Chester, CA (US) 96026

( * ) Notice: Subject to any disclaimer, the term of this patent is extended or adjusted under 35 U.S.C. 154(b) by 267 days.

(21) Appl. No.: 10/267,497

(22) Filed: Oct. 8, 2002

(65) Prior Publication Data

US 2004/0065523 A1 Apr. 8, 2004

Related U.S. Application Data

(63) Continuation of application No. PCT/US01/11485, filed on Apr. 9, 2001.
(60) Provisional application No. 60/196,245, filed on Apr. 9, 2000.

(51) Int. Cl.
*B65G 1/00* (2006.01)
*B65G 37/00* (2006.01)
*B65G 17/16* (2006.01)

(52) U.S. Cl. ................. 198/347.1; 198/347.3; 198/799

(58) Field of Classification Search ............. 198/347.1, 198/347.3, 377.01, 799, 475.1
See application file for complete search history.

(56) References Cited

U.S. PATENT DOCUMENTS 2,886,166 A * 5/1959 Lens ..................... 198/799
4,465,177 A * 8/1984 Dorner ................... 198/475.1
4,986,411 A * 1/1991 Splitstoser et al. ...... 198/475.1
5,050,726 A * 9/1991 Flagg et al. ............ 198/475.1
6,378,689 B1 * 4/2002 Wellpott ................. 198/799

* cited by examiner

*Primary Examiner*—Gene O. Crawford
(74) *Attorney, Agent, or Firm*—Bruce A. Jagger (57) ABSTRACT

A moving crank mechanism that is particularly adapted for use in a conveyor system. A moving crank remains in a substantially parallel position with respect to a fixed reference plane as the crank member is driven by its offset opposed ends along an endless loop. The closed loop vertical lift unit is adapted for use in an automated high-speed storage system. The vertical lift unit is adapted to be used as a primary storage location or as a lift for carrying objects in transit between levels in a storage system. The vertical lift unit includes a plurality of crank members with generally rigidly mounted shelves that are adapted to carry objects continuously and indefinitely as the shelves travel through a vertically oriented closed path. While traveling along the vertically oriented closed path the shelves remain parallel to a fixed horizontal plane so objects can be carried on the shelves while the shelves transition between the up and down reaches of the vertical lift mechanism. The opposed ends of the crank member are journaled in carriage members that are mounted to carry the respective ends of the crank member around the closed loop. The respective ends are carried around the closed loop at about the same rate. The closed loops are offset from one another by the amount of the crank offset. Shelf stabilizing mechanisms can also be employed.

16 Claims, 10 Drawing Sheets

MOVING CRANK MECHANISM

RELATED APPLICATIONS

Claims priority of United States of America Provisional Application Ser. No. 60/196,245, filed Apr. 09, 2000, and PCT/US01/11485, filed Apr. 09, 2001.

BACKGROUND OF THE INVENTION

1. Field of the Invention

The invention relates in general to a conveyor mechanism wherein the conveying elements remain substantially parallel to a fixed reference plane as the conveying elements continuously travel around a closed endless loop or path, and, in particular, to a closed loop vertical lift mechanism adapted for use in an automated storage system.

2. Description of the Prior Art

Previous expedients in developing high speed storage systems having increased efficiency and flexibility in transporting containers or other objects between a conveyor system and a storage carousel system have resulted in complex and expensive systems. Typically, low cost and uncomplicated storage systems are not very efficient or flexible in their ability to handle objects of various sizes in a variety of situations. More complicated storage systems can generally be made to achieve somewhat greater efficiency and flexibility, but at much higher construction, operation and maintenance costs. Thus, there is a need for developing an uncomplicated high speed storage system at low cost having high efficiency and flexibility. Rotary storage carousels that are adapted to run continuously around a closed horizontal loop, and from which objects can be extracted and inserted on the fly are well known. Rotary storage carousels typically have many vertical arrayed tiers of object support locations on them. Objects are typically conveyed to and from the rotary storage carousel through a conveyor system. Typically, the conveyor system does not have a level for every tier on the storage carousel. An object in the input phase of the system must be moved vertically between the level of the conveyor system and the level of the location on the storage carousel where it is to be stored. It must then be inserted onto the carousel at the right location while the carousel remains in motion. Timing is obviously critical to the successful insertion of the object onto the carousel. In the extraction phase an object must be taken from its storage location on the carousel and moved to the level of the conveyor system that is to transport it away from the storage carousel. Again, timing is critical. Various previous expedients had been proposed to accomplish the timing and vertical movement of objects between the level of the conveyor and the levels of the storage locations on the rotary storage carousel. Typically, such previous expedients included a vertical lift to carry objects vertically between the level of the conveyor and the appropriate level of the rotary carousel. A transfer mechanism was typically provided to transfer objects between the vertical lift and the rotary carousel. Typically, prior proposals for transfer mechanisms included elaborate restraining and releasing mechanisms within the transfer mechanism to accomplish the necessary timing function. Alternatively, timing was accomplished by software control routines that did not require any holding of objects in the vertical lift and transfer mechanisms to accomplish the desired timing.

In general, one of the constraints in prior art rotary carousel systems had been the fact that most vertical lifts could not carry objects over the top or around the bottom of the lift. This required that objects be placed on and removed from the same reach of the lift, either the vertically up or vertically down reach. Previous devices had been proposed for vertical storage systems wherein the shelves were mounted so as to permit objects to be carried indefinitely on the system as the vertical storage system moved through cycle after cycle. See, for example, Lichti, Sr. et al., U.S. Pat. No. 5,161,929. In Lichti, Sr. et al, the shelves are pivotally suspended by four continuous guide paths and an assortment of rollers so as to remain substantially horizontal. The guide paths are separate from the loop which drive the lift. Another attempt in the art, related to storage carousels and not vertical lifts, is Soviet Union Patent No. 865,718 to Stavisskii. Here, a separate drive system moves the shelves about a horizontal loop while four individual guide paths and rollers maintain the shelves substantially parallel with a fixed reference plane. In both of these systems the drive systems are separate from the guide systems. In addition, multiple guide systems are used.

Those concerned with these problems recognize the need for a simplified vertical lift mechanism capable of holding containers continuously and indefinitely as the vertical lift traverses through cycle after cycle of the endless loop through which the mechanism travels. The timing of insertion and extraction of objects on a rotary carousel is thus greatly simplified. It is also desired that such a mechanism comprise as few parts as possible and be relatively inexpensive.

These and other difficulties of the prior art have been overcome according to the present invention.

BRIEF SUMMARY OF THE INVENTION

The present invention comprises a simple conveyor wherein the conveyor elements remain substantially parallel to a fixed reference plane as the conveyor travels around an endless closed loop. That is, it is capable of carrying objects through the transitions between the reaches of the conveyor. Preferably, the conveyor takes the form of a vertical unit with generally vertically oriented up and down reaches. Preferably, the unit is capable of intermittent motion, and reversal of direction. This vertical lift form of the invention is particularly useful in automated storage systems where it functions, for example, as either a primary storage location or an elevator to transfer objects between different levels in a system where the primary storage capacity is provided by some other means.

The vertical lift unit comprises at least one, and preferably several, shelf members, each of which is rigidly mounted to its own moving crank member, and a mechanism for carrying the respective moving crank members around a generally vertically oriented endless lift loop. The moving crank member comprises a crank cross-member, crank arms (which may include at least one integral shelf member), and offset opposed crank ends. The shelf members are considered to be mounted to the crank members whether they are integral with and form part of the crank member, or are wholly separate members affixed to the crank member. The crank member is generally not symmetrical. That is, for example, one crank arm can be much longer than the other.

Each crank end is, for example, adapted to being journaled in and carried by a carriage element. The respective carriage elements are adapted, for example, to being driven around a generally vertically disposed endless lift loop. Each of the respective crank ends is carried around its own endless loop, for example, by the carriage elements. The movement of the carriage elements is synchronized so that the respective ends of the crank member move at about the same rate.

The plane in which a crank member is positioned is thus maintained substantially parallel to a single fixed reference plane as the crank member travels along the endless lift loop.

The respective endless loops are substantially duplicates of one another, but are mounted offset from one another so as to accommodate the offset between the respective opposed ends of the crank member. The offset of the endless loops from one another can be horizontal, vertical or in some other direction depending on the direction of the offset between the crank member ends. Regardless of the direction of the offset, the endless loops remain substantially parallel to one another and spaced apart by about the amount that the respective crank member ends are spaced apart.

A drive mechanism is operably associated with each of the endless loops for driving the respective carriage elements in that loop. Preferably, the drive mechanisms for the respective endless loops are mechanically inter-linked so the desired synchronization between the rates at which the respective carriage elements are driven is established and permanently maintained without operator intervention. There is generally no need for additional guide assemblies beyond those needed to maintain the shapes of the two endless loops about which the carriage members travel. Shelf stabilizers may be desirable in some configurations to closely maintain the orientation of the shelf member parallel to a chosen fixed reference plane. Preferably, several substantially identical crank members are assembled into the vertical lift so that at any given point in time there are several crank members on each reach of the lift.

Each crank member has a first journal end establishing a first axis and a second journal end establishing a second axis. The first and second axes are spaced apart and substantially parallel to one another, thus defining therebetween a crank plane. The shelf member associated with that crank member can be oriented parallel to the crank plane, or at some angle, such as, for example, normal to the crank plane, as desired. The first journal end is pivotally connected to, and carried by, a first carriage element around a first endless loop, and the second journal end is pivotally connected to, and carried by, a second carriage element around a second endless loop. The respective endless loops are operatively associated with drive members that propel the carriage elements around the respective endless loops. The carriage elements are driven at about the same rate, thus causing the crank member to which they are mounted to maintain about the same orientation relative to the horizon as they travel about a closed path or endless loop. The pivotal connections are substantially rigid and remain centered about their respective offset axes. The respective offset ends of the crank member move vertically along the up and down reaches of the vertical lift while the crank member itself remains substantially parallel to one fixed plane, for example, a generally horizontal fixed plane.

In a preferred embodiment the moving crank mechanism is adapted for use as a closed loop vertical lift mechanism for use in large rotary carousel storage and distribution systems. The closed loop vertical lift mechanism comprises, for example, two spaced apart horizontally offset endless loops about which several crank members are driven. Each endless loop comprises, for example, a continuous gear chain having a series of pivotally connected rigid links. The rigid links have internally facing linear gear teeth and an externally protruding carriage element pivotally connected to a journal end of a crank member. The gear teeth engage and are driven by at least one drive gear at some location along the endless loop. The gear chain thus carries the carriage elements around the endless loop.

The respective gear chains are supported, for example, by two guide path assemblies. Each guide path assembly comprises, for example, two vertically extending c-channels, a top carryover bearing plate, and a bottom carryover plate. Nylon rollers are provided at the pivot connection between adjacent links that are captured within, and travel through, the c-channels of the guide path assemblies on the upward and downward reaches of the vertical lift. This guide path assembly maintains the shape of the endless loop. Stability is also provided as the nylon rollers slidably ride against the top and bottom carryover plates of the guide assemblies as the links transition between the upward and downward reaches.

The endless loops, for example, are both driven intermittently by a common drive mechanism that ensures each carriage element in each endless loop is driven at the same rate. The drive means, for example, includes a stepper motor, which provides intermittent drive motion to the vertical lift. Importantly, the stepper motor, with its own breaking feature, eliminates the need for ratcheting stop mechanisms and the like, which would otherwise be required in order to precisely stop and hold the crank members after they have been moved at a predetermined time to a predetermined location. The drive mechanism can, for example, include a gear reduction ratio to assist the stepper motor in effectively driving the lift when heavy loads are applied.

Each crank member preferably supports a shelf member that is substantially rigidly mounted to the crank member and adapted to carry objects vertically between various levels in the system. As the crank members are driven about the closed path of the vertical lift, each crank plane, and, thus, each shelf member, member remains substantially parallel with a fixed reference plane. As a result, containers or objects can indefinitely and continuously remain on the shelves of the vertical lift even as it traverses between the up and down reaches of the lift. This greatly simplifies the timing of the insertion and extraction of objects.

In a preferred embodiment, two vertical lifts of the present invention are used, for example, in conjunction with a two way high speed storage system such as that disclosed in Lichti U.S. Pat. No. 5,505,586. The total system comprises a rotary storage carousel, a reciprocating shuttle, two vertical lifts, and two conveyor tracks. The vertical lifts are positioned between the conveyor tracks and the shuttles. The rotary storage carousel has vertical panels pivotally connected together in a closed loop much like a very large link belt resting on one edge. Each panel includes a plurality of vertically aligned storage shelves. The rotary storage carousel moves about a closed horizontal loop at a constant rate. The reciprocating shuttle comprises, for example, two columns of shuttle forks, which move back and forth between the storage carousel and the two vertical lifts. In the time it takes the storage carousel to move the distance of one panel, the reciprocating shuttle completes one cycle by moving from the storage carousel to the vertical lifts and back to the storage carousel. The reciprocating shuttle is, for example, mechanically synchronized with the movement of the storage carousel. The shuttle is configured such that only one column of shuttle forks can selectively deliver containers to the storage carousel and the other column can only selectively remove containers from the storage carousel. Each column of shuttle forks is associated with one vertical lift, and each vertical lift is associated with a conveyor track. Because the columns of shuttle forks are dedicated to different functions, one vertical lift performs the function of delivering containers from the conveyor track to the storage carousel via the shuttle, and the other performs the function of retrieving containers from the storage carousel via the shuttle for placement on the conveyor track. According to the present invention, one vertical lift can be used for both the input and extraction sides of the system, if desired.

Vertical lifts according to the present invention, when used in a two way high speed storage system substantially increase the efficiency and flexibility of the system in handling objects such as containers. Back-up on the conveyor track when the storage carousel is near full capacity is eliminated because the objects can remain indefinitely on the vertical until on open location on the storage carousel arrives. In addition, possible collisions between objects on the reciprocating shuttle and on the storage carousel are eliminated. Objects can more quickly be handled in transport between the storage carousel and the conveyor tracks because the vertical lift can be driven in multiple increments of the distance between two adjacent shelves, as desired. In addition, objects are not committed for transport to the storage carousel or to a specific spot on the storage carousel when they are placed on the vertical lift. If desired, an object can be transferred back to the conveyor assembly without having to be inserted onto and extracted from the storage carousel.

A particularly preferred embodiment of the present invention contemplates the use of the vertical lift as the primary storage location in an automated storage system. Typically, several vertical lifts are placed in operative association with a conveyor system. The vertical lifts can be distributed throughout the system as needed, unlike a rotary carousel based system. In general, the vertical lift based storage systems will have from approximately 10 to 30 shelves on each reach. Thus, when an object is to be retrieved from a vertical lift that can be driven in both directions, it is at the most no more than approximately 10 to 30 shelve widths away from the insertion and extraction level. In a vertical lift that can only be driven in one direction, an object is no more than approximately 20 to 60 shelf widths away from the insertion and extraction level. This provides very fast access to the desired objects during both the extraction and insertion phases of the operation. Very fast access can be achieved even while the vertical lift is operating at low speeds. Since insertion and extraction always occur at the same level, preferably when the lift is stationary, no mechanism is required to move objects between a conveyor level and a storage level, or to synchronize the movement of the inserters and extractors with the movement of the lift. Insertion and extraction can be automated with simple pusher mechanisms, or they can be performed manually. The vertical lifts can operated continuously, if desired. Continuous operation may be desirable, for example, when the load on the lift is so heavy that stopping and starting the vertical lift would impose unacceptable loads on the mechanism. The location of objects on the vertical lifts in a system can be accounted for and tracked by appropriate software, and identification devices, as will be understood by those skilled in the art. Automation of a vertical lift based storage system is easier and simpler than is the automation of a rotary storage carousel system, because, inter alia, the timing of the handling of the objects is simpler, and less handling is involved in the insertion and extraction operations.

Other objects, advantages, and novel features of the present invention will become apparently from the following detailed description of the invention when considered in conjunction with the accompanying drawings.

BRIEF DESCRIPTION OF THE DRAWINGS

The present invention provides its benefits across a broad spectrum of automated storage systems. While the description which follows hereinafter is meant to be representative of a number of such applications, it is not exhaustive. As those skilled in the art will recognize, the basic methods and apparatus taught herein can be readily adapted to many uses. It is applicants' intent that this specification and the claims appended hereto be accorded a breadth in keeping with the scope and spirit of the invention being disclosed despite what might appear to be limiting language imposed by the requirements of referring to the specific examples disclosed.

Referring particularly to the drawings for the purposes of illustration only and not limitation.

DETAILED DESCRIPTION OF THE PREFERRED EMBODIMENTS

Referring now to the drawings, for the purposes of illustration and not limitation, wherein like reference numerals designate identical or corresponding parts throughout the several views, there is illustrated generally at 10 a vertical lift mechanism of the present invention wherein the endless loops 12 and 14 are offset horizontally from one another.

Figure 1:
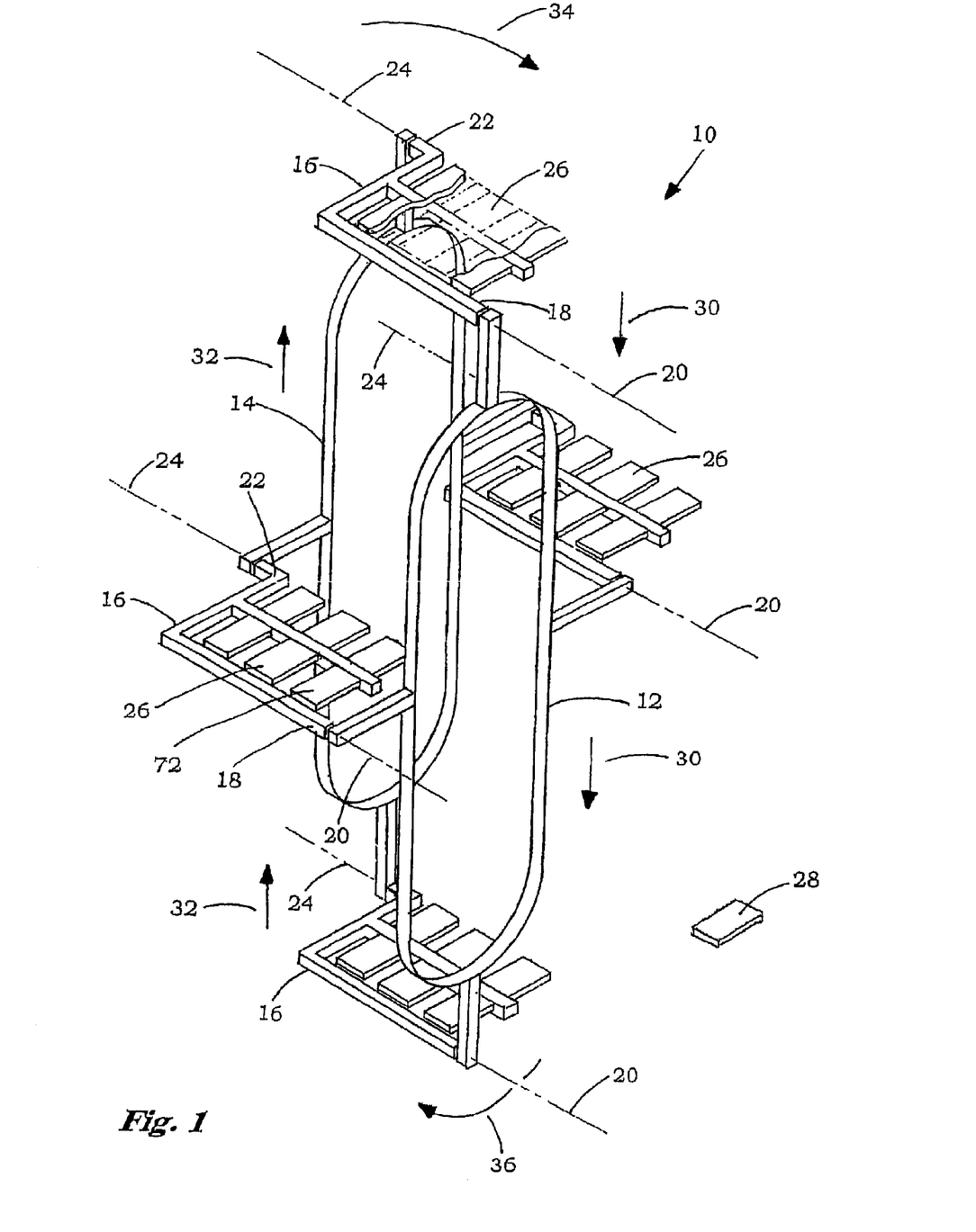
FIG. 1 is a diagramatic schematic perspective view of a vertical lift of the present invention.

The moving crank mechanism is shown schematically in FIG. 1 to facilitate the discussion of the unique features of the mechanism and its operation. The moving crank mechanism 10 comprises a first endless loop 12, a second endless loop 14, and a plurality of crank members 16. Each crank member has a first journal end 18 establishing a first axis 20 and an opposed second journal end 22 establishing a second axis 24. It is significant that the opposed first and second axes for each crank member are offset and substantially parallel to one another. This parallel offset establishes a crank plane between the axes for each crank member. In the embodiment chosen for illustration purposes, the shelf members 26, which are mounted to each crank member, reside within the crank planes. Each of the opposed journal ends is pivotally connected to a carriage member. The carriage members are mounted to be driven along the respective loops. Each journal end is carried around the associated endless loop by the operatively associated carriage member. Each journal end pivots about its axis in its mounting to the carriage element that carries it as the carriage element travels along the associated endless loop. The crank planes remain substantially parallel to fixed reference plane 28 at all locations along the endless loops. Thus, objects placed on the shelf members 26 are not thrown off by changes in the planar orientation of the shelf members during the operation of the moving crank mechanism.

For purposes of describing the operation of the mechanism, FIG. 1 shows the first and second endless loops being driven in a counterclockwise direction, however they could also be driven clockwise. As carriage members are driven along the endless loops at substantially the same rate, each crank member travels along a closed path, and is maintained substantially parallel with reference plane 28. The fixed reference plane 28 shown in FIG. 1 is horizontal, however the fixed reference plane may be oriented in any position, such as, for example, in a vertical plane. The closed path in FIG. 1 is generally vertically oriented, but may be oriented in other configurations, such as, for example, horizontal, and the like. The shapes of the endless loops can be different from those illustrated, for example, oval, circular, and the like.

The closed path or endless loop in which the shelves of the unit travel has a generally vertically downward reach 30, a generally vertically upward reach 32, a top arcuate carryover or transition portion 34, and a bottom arcuate carryunder or transition portion 36. Uniquely, objects can be placed on shelf members 26 and maintained on the unit indefinitely as the shelf members travel along the full length of the closed path. The elegant mechanism that accomplishes this is very simple, inexpensive and requires minimum maintenance.

In a preferred embodiment, which has been selected for purposes of illustration, the moving crank mechanism is adapted for use as a closed loop vertical lift mechanism for use in an automated storage systems. It is to be appreciated that the moving crank mechanism of the present invention is suited for a wide variety of other applications in which modifications and changes may be made without departing from the spirit and scope of the invention and the accompanying claims.

Figure 2:
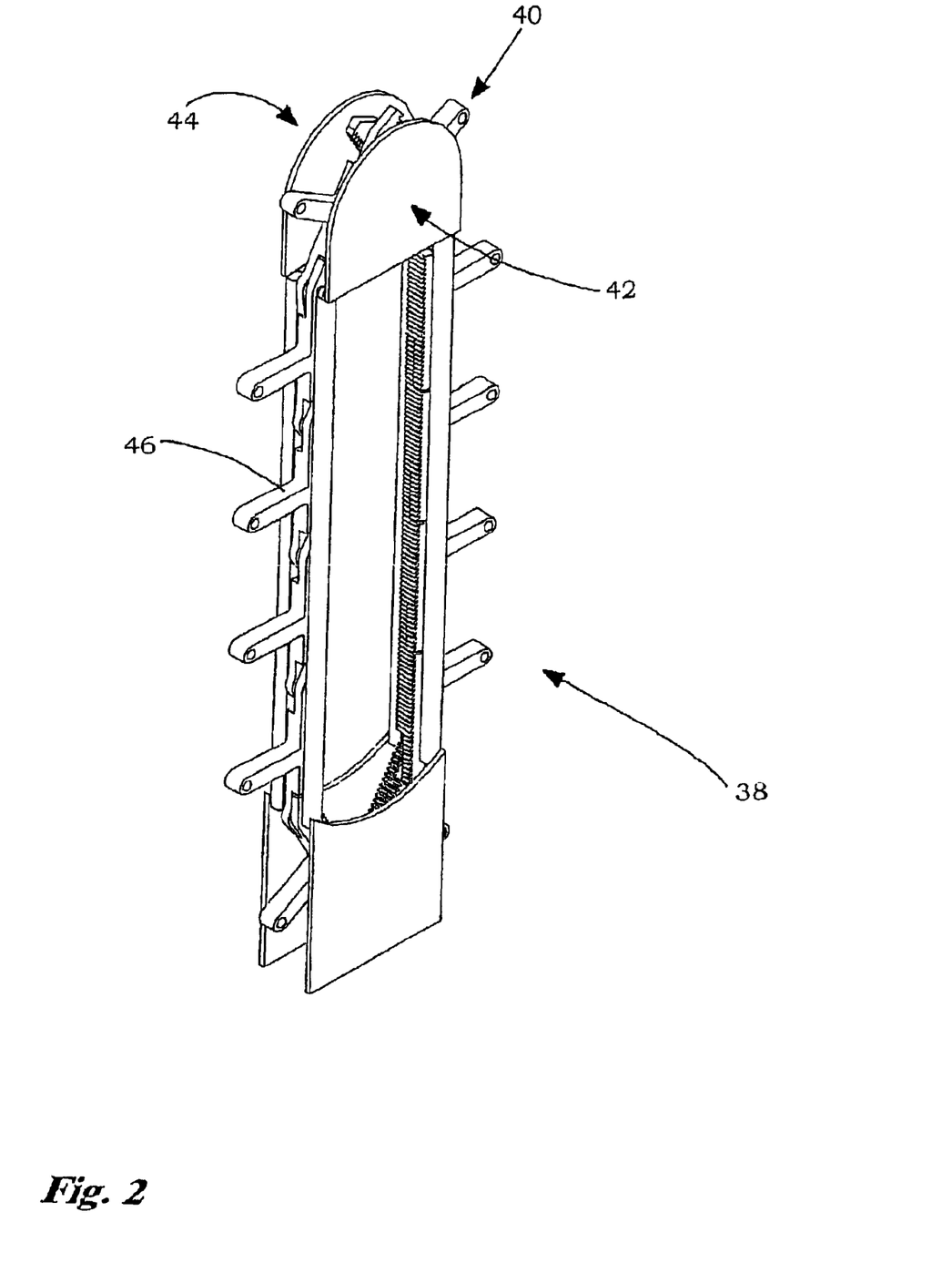
FIG. 2 is a diagramatic perspective view of one endless loop of a preferred embodiment of the present invention.
Figure 3:
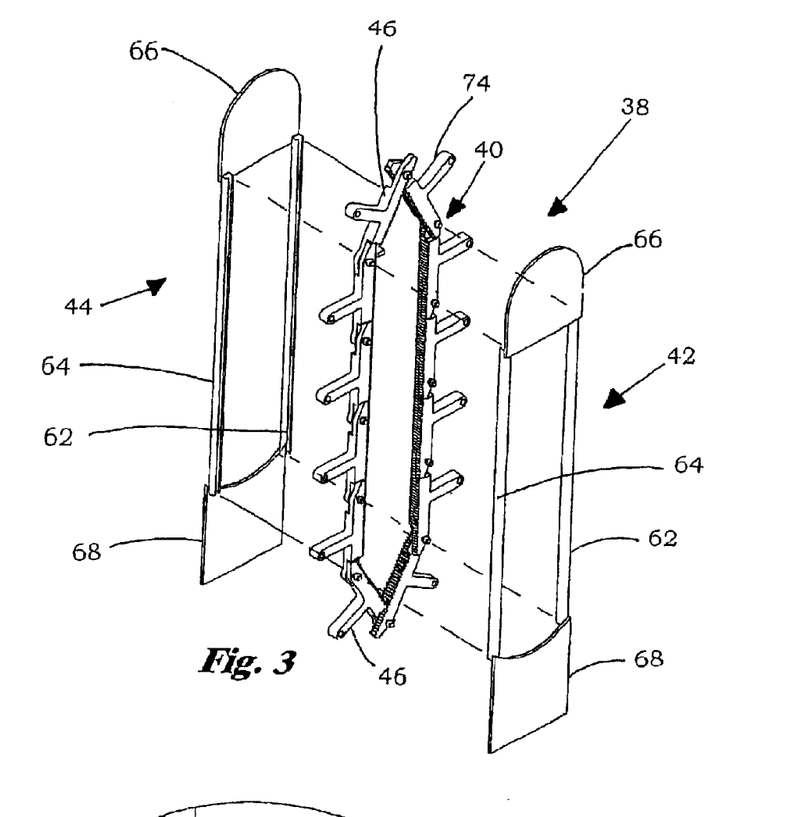
FIG. 3 is a diagramatic exploded perspective view of the endless loop shown in FIG. 2.
Figure 4:
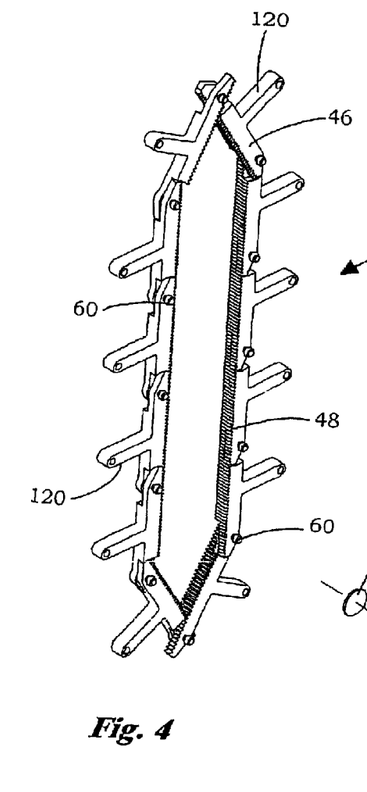
FIG. 4 is a perspective view of a continuous gear chain of a preferred embodiment of the present invention.
Figure 5:
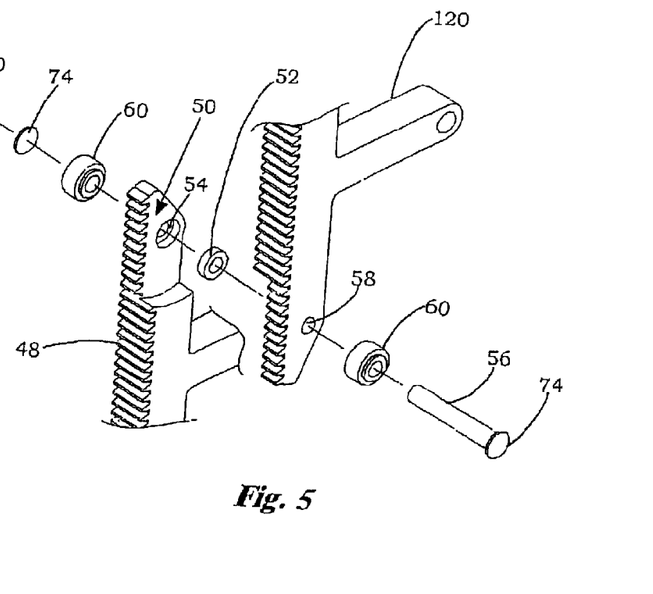
FIG. 5 is an exploded fragmentary perspective view of the pivotally connected rigid links of the continuous gear chain shown in FIG. 4.

In FIGS. 2 and 3, for example, there is generally shown at 38 a preferred embodiment of a drive gear chain, carriage elements and a guide structure that define and endless loop adapted to be used in a vertical lift unit according to the present invention. The elements that go to make up endless loop 38 are illustrative of both the first and second endless loops since the two loops define identical paths. Endless loop 38 comprises a continuous gear chain shown generally at 40, and two guide path assemblies generally shown at 42 and 44. Shown in FIG. 4 is the continuous gear chain 40 which comprises a series of pivotally connected rigid links 46 having internally facing linear gear teeth 48. A recess 50 is provided in each end of each link 46 so that the gear teeth of adjacent links align when the links are vertically oriented, as shown in FIG. 5. A roller bearing 52 is inserted inside of a recessed link hole 54 on one end of each link. The links are pivotally connected with a link pin 56 that is inserted through a link hole 58, bearing 52, and the recessed link hole 54. A nylon roller 60 is provided externally on both sides of each link connection and are pivotally secured by the link pins 56.

The continuous gear chain 40 is supported by two guide path assemblies 42 and 44, as shown in FIGS. 2 and 3. Each guide path assembly comprises two c-channels 62 and 64, a pair of top carryover bearing plates 66, and a pair of bottom carryunder bearing plates 68. When the links 46 of the gear chain travel through the vertical upward and downward portions of the loop, the nylon rollers 60 are captured within, and travel through, the c-channels 62 and 64 of each guide path assembly. The c-channels guide and maintain the shape and path of the continuous gear chain through the straight generally vertically upward and downward reaches.

Figure 6:
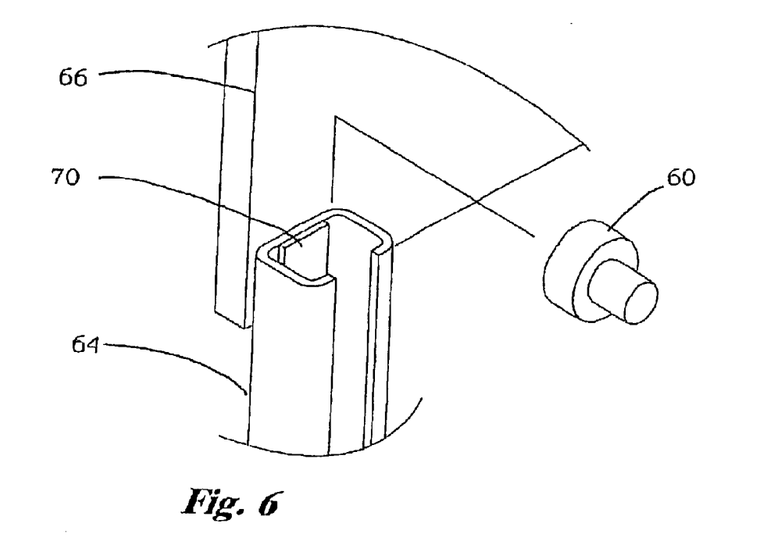
FIG. 6 is a fragmentary perspective view of a c-channel and top carryover plate of the guide path assemblies of the endless loop shown in FIGS. 2 and 3.
Figure 8:
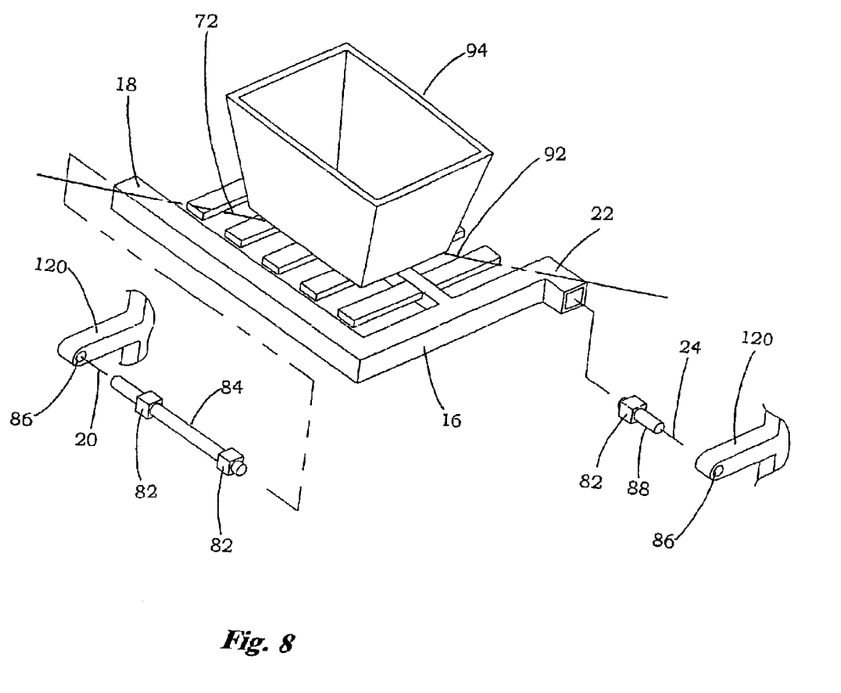
FIG. 8 is an exploded fragmentary perspective view of a preferred embodiment of a crank member showing its pivotal attachment to the rigid links of both associated endless loops.

As shown in FIG. 6, a nylon bearing surface 70 is provided within each c-channel to reduce friction. Referring to FIGS. 1 and 8, the crank members have a tendency to try to rotate about diagonal line 72, which passes through the pivotally connected first and second journal ends. This tendency to rotate increases when off-center loads are placed on the shelf members. This tendency to rotate, which can induce some flexing of each journal end and some binding of the nylon rollers in the c-channels, is compensated for with bearing surfaces 74 provided on the ends of each link pin 56. These bearing surfaces 74 slidably ride against the nylon bearing surfaces 70 provided within the c-channels. When the links transition between the upward and downward reaches, the stability of the continuous gear chain is maintained by the bearing surfaces 74, which slidably ride against the carryover and carryunder plates 66 and 68 on each side of the chain.

Figure 7:
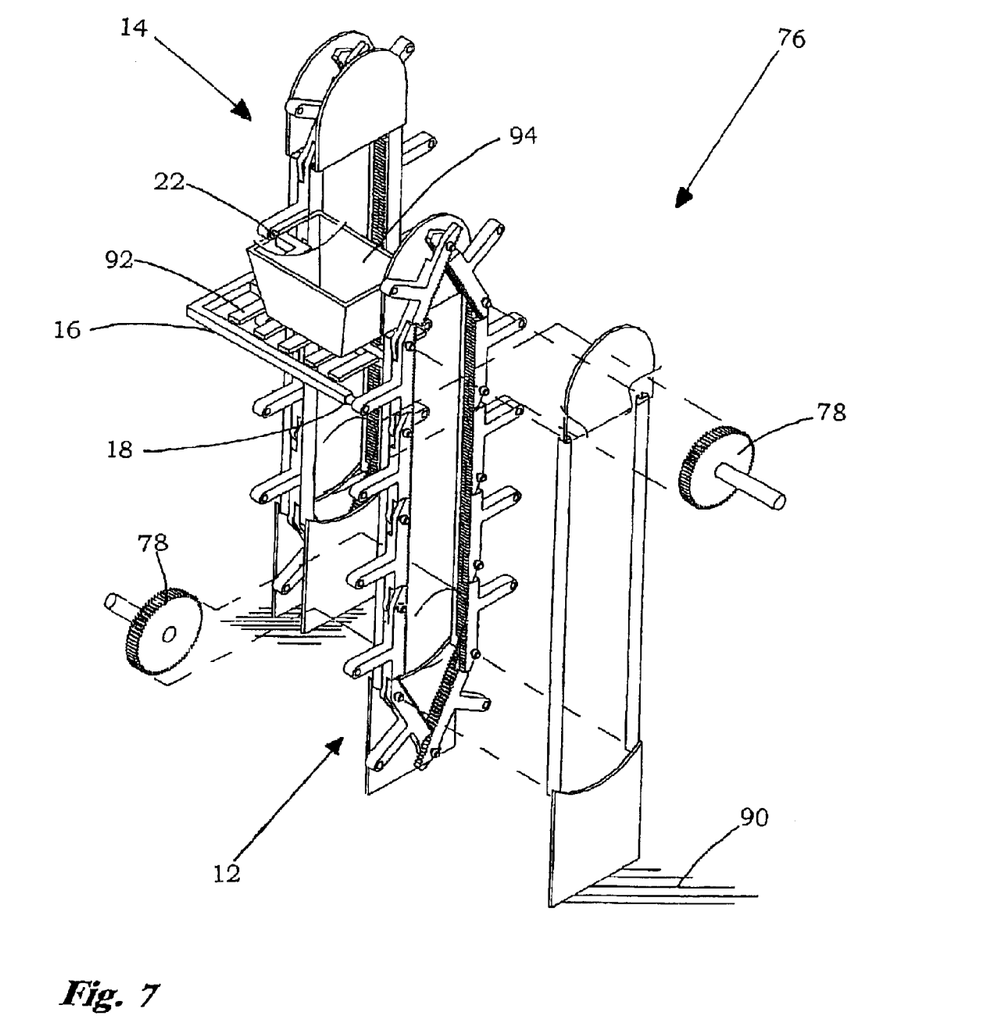
FIG. 7 is a diagramatic exploded perspective view of a preferred embodiment of the vertical lift of the present invention shown without a support frame.
Figure 9:
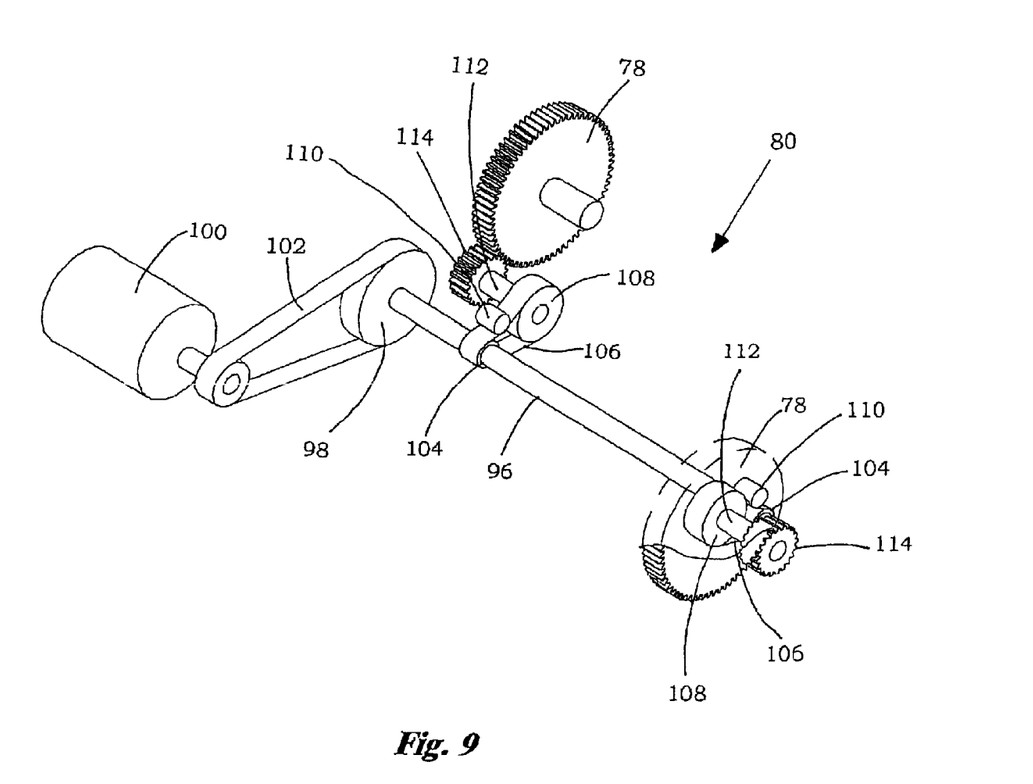
FIG. 9 is a diagramatic perspective view of a drive mechanism for the embodiment of the vertical lift shown in FIG. 7.

Referring to FIG. 7, a preferred embodiment of the closed loop vertical lift unit is shown generally at 76. For each continuous gear chain 40 associated with the first and second endless loops, 12 and 14, respectively, one or more drive gears 78 is provided that engages the gear teeth 48 of the continuous gear chains between their upward and downward reaches (drive gears 78 shown removed from their drive positions for clarity). The drive gears are linked together by a drive assembly, a typical one of which is shown in FIG. 9 generally at 80, which move the continuous gear chains for each endless loop at the same rate. Other drive mechanisms and linkages can be employed, if desired.

Extending outwardly from the center of each link 46 is an integral carriage member 120. Although both endless loops are preferably identical, carriage members 120 are referred to as first carriage members on the first endless loop, and as second carriage members on the second endless loop. As shown, for example, in FIGS. 7 and 8, each first carriage member is pivotally attached to the first journal end 18 of a crank member 16, and each second carriage member is pivotally attached to the second journal end 22 of a crank member (only one crank member shown for clarity).

Referring to FIG. 8, the pivotal attachment of the carriage members to the journal ends is shown in greater detail. Each crank member 16 is pivotally secured to remain substantially parallel with a fixed reference plane by three bearings 82. The first and second journal ends, 18 and 22, are configured in the shape of a square tube. A first pivot rod 84 is securely attached to a mounting hole 86 in the end of the first carriage member 120. This secure attachment maintains the first pivot rod 84 axially centered with the first axis 20 (FIG. 1) of each crank member 16. A second pivot rod 88 is securely attached to a mounting hole 86 in the end of the second carriage member 120, maintaining the second pivot rod axially centered with the second axis 24 (FIG. 1) of each crank member. The bearings 82 have a square external surface which engage the inside of the square tube ends of the first and second journal ends. One of the bearings 82 is rotatably secured on the second pivot rod 88. Two of the bearings 82 are secured on the first pivot rod 84. The three bearings establish a three point support for each crank member that maintain the crank plane of each crank member substantially parallel with the fixed reference plane 90, as shown in FIG. 7, as the driven members of the endless loops are driven through their paths by drive gears 78. As illustrated, fixed reference plane 90 extends horizontally. As will be understood by those skilled in the art, reference plane 90 can extend at any angle that may be chosen for a particular application.

In the preferred embodiment that was chosen for purposes of illustration, the crank members are adapted to support objects placed on them in their crank planes. Shown in FIGS. 7 and 8, a fork-shaped shelf member 92 is rigidly mounted to each crank member (only one crank member is shown for clarity). Other shapes for the shelf members can be used, as desired. This preferred embodiment is adapted for carrying containers 94 continuously and indefinitely on the shelf members 92 throughout their travel along the upward reach, top carryover portion, downward reach, and bottom carryunder portion, of the closed path. Referring to FIG. 8, it is desirable to adjust the dimensions of crank member 16 so that when a container 94 is placed on the shelf of a crank member, its center lies as directly above diagonal line 72 as possible. Since diagonal line 72 is the axis about which the crank member has a natural tendency to rotate, dimensioning the crank member to place the center of a container along this line minimizes the stresses imposed on the elements of the unit, particularly when heavy objects are placed in the containers.

Important to the proper functioning of the preferred embodiment of the vertical lift is the synchronization of the movement of the carriage members 120 along the first and second endless loops. Referring particularly to FIG. 9, the drive assembly 80 of the preferred embodiment is shown (the endless loops are removed for clarity). The drive assembly 80 comprises a synchronization shaft 96 having a drive pulley 98 connected to a stepper motor 100 via a drive belt 102. This provides a gear reduction between the motor and the synchronization shaft. Two reduction pulleys 104 are attached to the synchronization shaft 96, one for driving the members of the first endless loop and the other for driving the members of the second endless loop. Drive belts 106 connect the reduction pulleys 104 to larger pulleys 108 to further reduce the gear ratio of the drive assembly. Because the gear ratio between the stepper motor and drive gears 78 is reduced, torque loads on rotating shafts 112 can be substantial when the motor is operated. Tension rollers 110 are provided to bear against drive belts 106 to eliminate slipping due to the increased torque loads on rotating shafts 112. The larger pulleys 108 are mounted on one end of rotating shafts 112 and pinion gears 114 are mounted on the other ends of the shafts. The pinion gears 114 engage drive gears 78. The combined gear reduction ratio from the motor and drive gear allows a smaller stepper motor to drive heavily loaded lifts with ease. Other combinations of motors and drive elements such as toothed belts, chains, directly intermeshed gears, and the like, can be used as desired, depending on the operational requirements for a particular unit.

Figure 10:
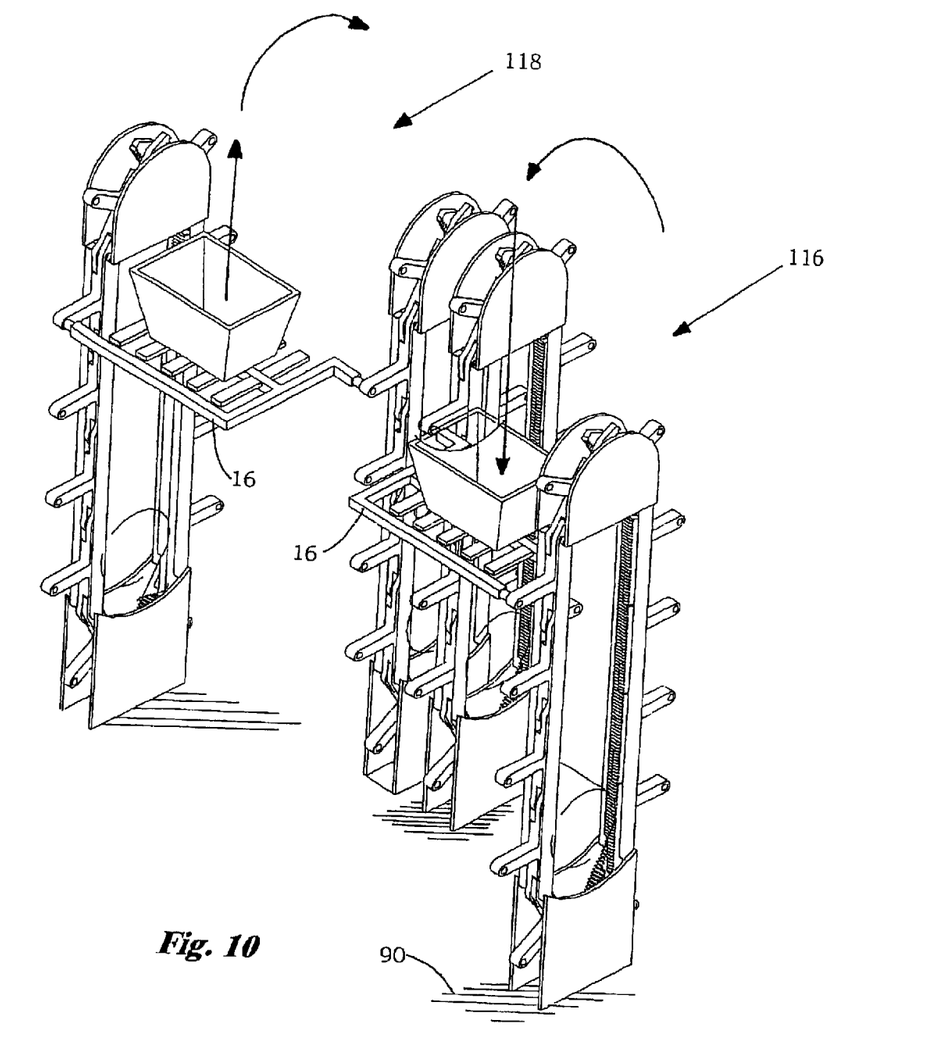
FIG. 10 is a diagramatic perspective view of two vertical lifts of the embodiment shown in FIG. 7, shown without support frames, positioned for use in a rotary storage carousel system.
Figure 11:
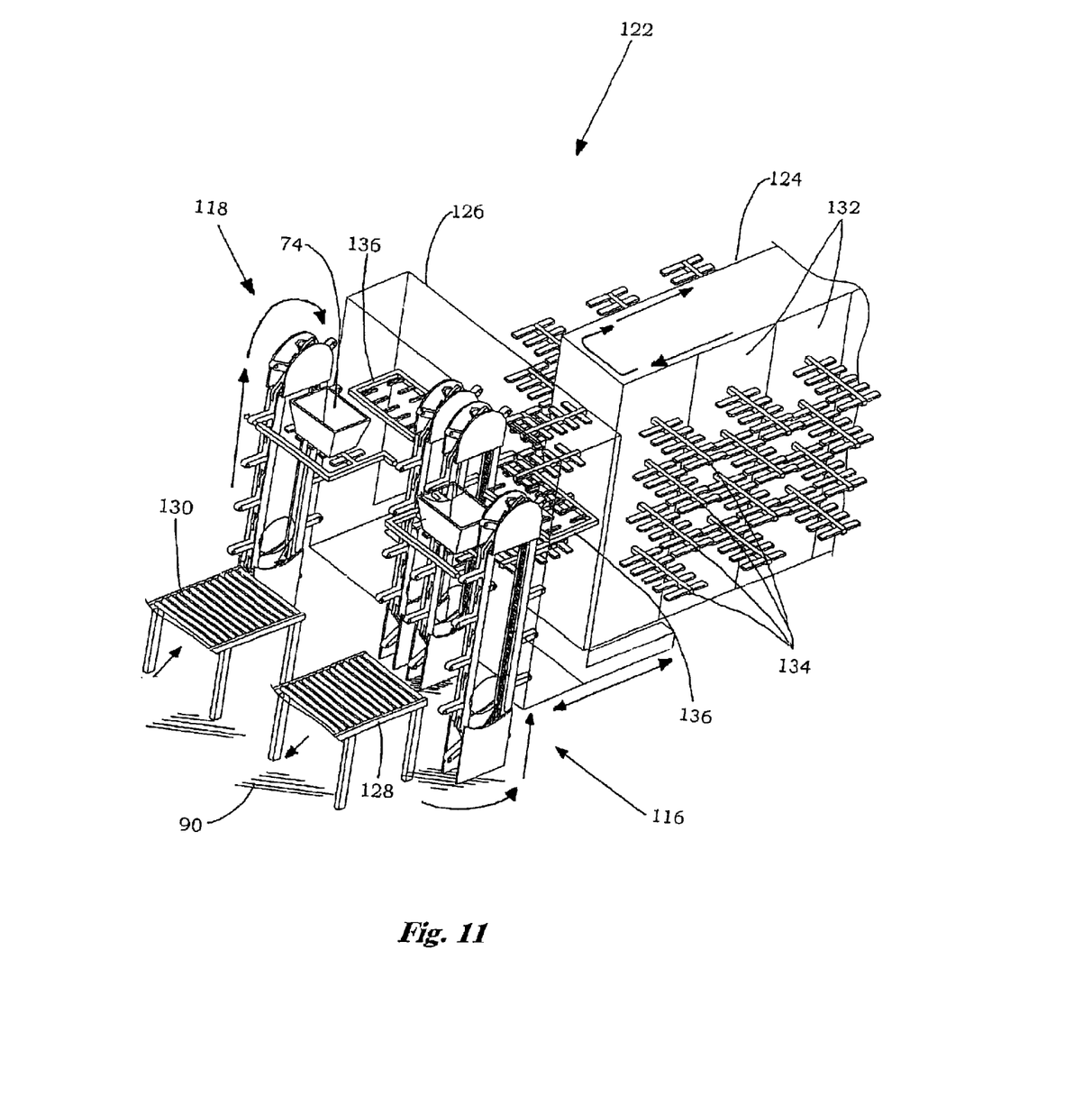
FIG. 11 is diagramatic perspective view of a two way high speed storage system in conjunction with the vertical lifts shown in FIG. 10.

The vertical lift of the present invention is well suited for use in a high speed automated rotary storage carousel system. Shown in FIGS. 10 and 11 are two vertical lifts of the present invention, generally shown at 116 and 118, which are positioned to be used as the vertical lifts in a rotary storage carousel system such as that shown in FIG. 11. In FIG. 10 the frame structures to support the endless loops have been removed for clarity. In one mode of operation, vertical lift 118 is operated clockwise to move objects from the level of a conveyor to a storage level on a rotary storage carousel, and vertical lift 116 is operated counterclockwise to convey objects from a storage level on a rotary carousel to a conveyor level. If desired, it is also possible to operate both vertical lifts 116 and 118 in the same clockwise or counterclockwise direction at the same time, or to reverse their directions of operation.

Referring to FIG. 11 there is generally shown at 122 a two way high speed rotary carousel based storage system. The storage system comprises a rotary storage carousel 124 and reciprocating shuttle 126, two vertical lifts of the present invention, 118 and 116, and two conventional conveyor tracks, 128 and 130. The reciprocating shuttle 126 is mechanically synchronized with the rotary storage carousel 124. The storage carousel has vertical panels 132, which travel continuously about a closed horizontal loop. Each vertical panel has a column of vertically aligned shelves 134 adapted to hold containers on the storage carousel. Preferably, the rotary storage carousel moves continuously at a constant rate. When the storage carousel moves one panel length, the reciprocating shuttle completes one cycle moving from the storage carousel to the two vertical lifts and back to the storage carousel. The shuttle has two columns of vertically aligned shuttle forks 136 spaced apart the same distance as the columns of shelves 134 of the storage carousel. Only one shuttle fork for each column is shown in FIG. 11 for clarity. One column of shuttle forks is associated with the shelves of vertical lift 116 and another column is associated with the shelves of vertical lift 118. The shelves of each vertical lift, 116 and 118, are spaced apart vertically about the same distance as the shelves in the column of shelves 134 of the storage carousel. In FIG. 11, only one shelf for each lift is shown for clarity.

The storage system 122 in FIG. 11 is shown in a preferred mode of operation. Those skilled in the art will appreciate other modes of operation are possible which can also take advantage of the unique features of the vertical lift of the present invention. In the mode of operation shown in FIG. 11, vertical lift 118 is generally dedicated to delivering objects to the storage carousel and vertical lift 116 is generally dedicated to removing objects from the storage carousel. Dedicating the vertical lifts to opposed functions, that is, one to delivering and the other to removing, is, however, not required when using the vertical lifts of the present invention.

The unique features of the vertical lift of the present invention substantially increases the efficiency and flexibility of a high speed rotary storage carousel system. For instance, when the storage carousel is near full capacity, it often takes a substantial amount of time for a vertical panel having an available shelf to rotate to a position where the shuttle can deliver an object to the storage carousel. In this situation the delivery conveyor track can undesirably back-up, reducing the efficiency of the system. The vertical lifts of the present invention permit objects to be held on the vertical lift until an opening approaches on the rotary carousel. It is even possible to return objects from the input conveyor to the input conveyor, without disrupting the system. The same is true on the output side. The timing of the operation of the system is greatly simplified.

Figures 12, 13:
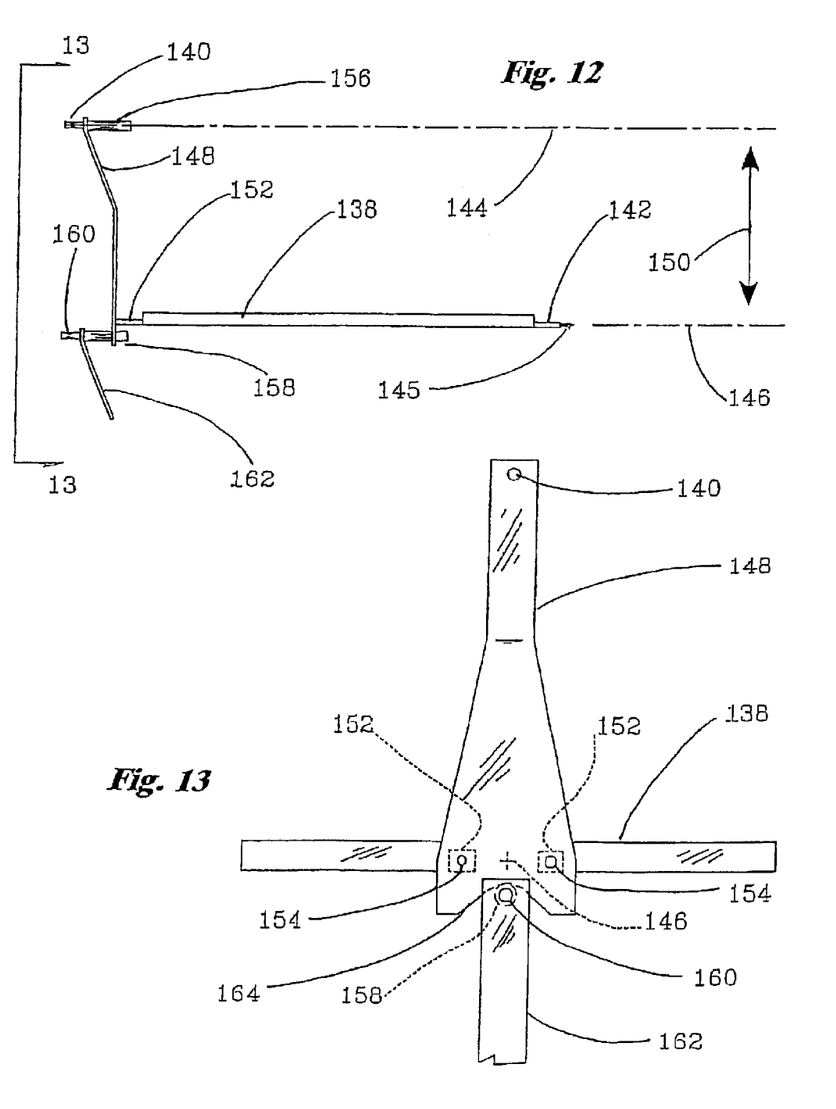
FIG. 12 is a diagramatic front elevational view of a vertically mounted crank member with an integral horizontal shelf member.
FIG. 13 is side elevational view taken along line 13—13 in FIG. 12.

Referring, for example, to FIGS. 12 and 13, there is diagramatically illustrated a crank member with a shelf mounted thereto. This preferred embodiment is intended to be mounted with the respective crank ends offset vertically from one another. The vertical offset of the crank ends necessitates that the endless loops be disposed in an offset vertical relationship wherein they are offset by about the same amount that the crank ends are offset from one another. This embodiment is particularly well adapted for use as a vertical storage que where it is the main storage facility for the system. That is, objects are placed on storage locations on units of this embodiment, and are carried indefinitely by this embodiment.

A horizontally extending shelf member 138 is rigidly mounted to a vertically mounted crank member. Shelf member 138 is integral with and forms a part of the crank member to which it is mounted. Shelf member 138 forms a crank arm of the crank member. An extension 142 of the shelf member 138 mounts an axially extending first crank end element 145. Two extensions 152 of shelf member 138 extend towards and are attached rigidly to crank cross-member 148 by means of fasteners 154. A second crank end element 140 is opposed to first crank end element 145. The longitudinal axis 144 of second crank end element 140 extends generally parallel to the longitudinal axis 146 of first crank end element 145. The respective longitudinal axes 144 and 146 are offset vertically from one another as indicated at 150. The crank end elements 140 and 145 are adapted to be journaled in and carried around endless loops by respective carriage members similar to those illustrated, for example, in FIGS. 1–3, 4, 5, 7, 8 10 and 11.

Shelf stabilizers, typical ones of which are illustrated at 156 and 158 are provided to stabilize the shelf members as they travel on the up and down reaches of a vertical lift mechanism. Stabilization is accomplished, for example, by the engagement of a stabilizing notch 164 of crank cross-member 148 with shelf stabilizer 158. The shelf stabilizers are, for example, stub shafts that are coaxial with and mounted to the crank end elements on one side of the unit. Thus, each shelf member is stabilized by the engagement of the notch in its crank arm with the shelf stabilizer that is associated with the second crank end element of the shelf member below it. For example, shelf 138 is stabilized by inter engagement of its stabilizing notch 164 with shelf stabilizer 158. Shelf stabilizer 158 is associated with the second crank end 160 and crank cross-member 162 of the crank member below. The shelf members are stabilized by such inter engagement while they are traveling on the straight reaches of the system. In those embodiments wherein the carriage members are in the form of arms that project generally outwardly from the driving elements of the endless loop, the arms extend generally horizontally on the straight reaches, and vertically on the arcuate portions of the endless loops. See, for example, FIG. 1. When the carriage members begin to traverse between a straight reach and an arcuate portion of the endless loops the movement of the carriage members toward the vertical position causes the distance between the shelf members to increase, thus causing the disengagement of the stabilizing mechanisms. This disengagement permits the shelf members to negotiate the arcuate transition between straight reaches. The shelf members are stabilized solely by the offset of the crank ends while negotiating the arcuate portions of the endless loops. On the straight reaches of the endless loops the shelf members are stabilized by both the offset and the inter engagement of the stabilizing members.

Appropriate control means may be used with any of the embodiments of the present invention, as desired, to operate the stepper motors 100 of the drive means to vary the direction and speed at which the vertical lifts move. Desirably, the motion of the vertical lifts is controlled such that the crank members come to a complete stop, or approximately to a complete stop, when objects are inserted onto or extracted from the vertical lift. The intermittent motion is achieved by the stepper motor. The stepper motor, with its own braking feature, eliminates the need for ratcheting stop mechanisms, and the like, which would otherwise be required in order to precisely stop and hold the crank members at the correct time and position in the system.

What has been described are preferred embodiments. It is to be appreciated by those skilled in the art that the moving crank mechanism can readily be adapted for use in many applications. Many modifications and variations of the present invention are possible in light of the above teachings. It is therefore to be understood that, within the scope of the appended claims, the invention may be practiced otherwise than as specifically described.

What is claimed is:

1. A conveyor unit including a shelf member, said conveyor unit comprising:

a crank member having generally opposed first and second end elements offset from and extending generally parallel to one another, said first and second end elements defining therebetween a crank plane, said plane extending generally parallel to a fixed reference plane, said shelf member being mounted to said crank member;

a first carriage member journaled to said first end element, said first carriage member being mounted to be driven along an endless first loop at a first rate;

a second carriage member journaled to said second end element, said second carriage member being mounted to be driven along an endless second loop at about said first rate, whereby said crank plane is adapted to remain substantially parallel to said reference plane as said first and second carriage members are driven along said first and second loops, each of said first and second endless loops including a continuous gear chain having a plurality of pivotally connected rigid links, each of said pivotally connected rigid links including facing linear gear teeth and an externally projecting said carriage member; and a drive mechanism drivingly associated with said first and second carriage members, said drive mechanism including at least one drive gear adapted to divingly engage said internally facing linear gear teeth.

2. A conveyor unit of claim 1 wherein said drive mechanism includes a reversable stepper motor.

3. A conveyor unit of claim 1 including a shelf stabilizing mechanism.

4. A conveyor unit of claim 3 wherein the shelf stabilizing mechanism includes stabilizing elements positioned to stabilizingly inter engage on straight reaches of said endless loops, and to disengage on arcuate transition portions of said endless loops.

5. A conveyor unit of claim 1 including at least one carryover plate adapted to slidably support said pivotally connected rigid links as said pivotally connected rigid links transition from moving in one direction to moving in a generally opposed direction along said endless loops.

6. A conveyor unit of claim 5 wherein said first and second endless loops are offset horizontally from one another.

7. A conveyor unit of claim 5 wherein said first and second endless loops are offset vertically from one another.

8. A vertical lift mechanism comprising:
a crank member having generally opposed first and second ends extending generally parallel to and offset from one another;
a first carriage element mounted for movement around a generally vertically extending first endless loop;
a second carriage element mounted for movement around a generally vertically extending second endless loop, said first and second endless loops being substantial duplicates mounted generally parallel to and offset from one another, said first end being pivotally mounted to and moveable with said first carriage element, and said second end being pivotally mounted to and moveable with said second carriage element, said first and second carriage elements being mounted for generally synchronous movement along said first and second endless loops, each of said first and second endless loops including a continuous gear chain having a plurality of pivotally connected rigid links, each of said pivotally connected rigid links including an externally projecting said carriage element; and
a shelf member generally rigidly mounted to and moveable with said crank member.

9. A vertical lift mechanism comprising:
a crank member having generally opposed first and second end members extending generally parallel to and offset from one another by an offset amount;
a first endless loop;
a second endless loop, said second endless loop extending generally parallel to, spaced from, and offset from said first endless loop, said second endless loop being offset from said first endless loop by about said offset amount, said first and second endless loops being substantial duplicates;
a first carriage member mounted for movement along said first endless loop;
a second carriage member mounted for movement along said second endless loop, each of said first and second endless loops including a continuous gear chain having a plurality of pivotally connected rigid links, each of said pivotally connected rigid links including an externally projecting said carriage member;
a carriage member driving assembly drivingly associated with said first and second carriage members, said carriage member driving assembly being adapted to intermittently and reversibly driving said continuous gear chain around said endless loops;
said first end member being mounted to and moveable with said first carriage member, and said second end member being mounted to and moveable with said second carriage member.

10. A closed loop vertical lift mechanism for use in an automated container storage system, said lift mechanism being adapted to carry objects continuously and indefinitely generally vertically about a closed loop, said lift mechanism comprising:
a plurality of crank members, each of said crank members having first and second journal ends, each said first journal end establishing a first axis, each said second journal end establishing a second axis, said first and second axes of each said crank member extending substantially parallel to one another and spaced apart a predetermined distance from one another, said first and second axes of each said crank member defining a crank plane;
a shelf member rigidly mounted to substantially each said crank member, each said shelf member having an object supporting surface, each said object supporting surface extending generally horizontally;
a first carriage element pivotally attached to each said first journal end of each said crank member, each said first carriage element being adapted to be driven around a first endless loop;
a second carriage element pivotally attached to each said second journal end of each said crank member, each said second carriage element being adapted to be driven around a second endless loop, each of said first and second endless loops including a continuous gear chain having a plurality of pivotally connected rigid links, each of said pivotally connected rigid links including an externally projecting said carriage element;
said first and second carriage elements adapted to carry said crank members along said endless loops at a substantially constant rate, wherein each said object supporting surface remains generally horizontal.

11. A closed loop vertical lift mechanism of claim 10 wherein said closed loop vertical system is mounted in an automated storage system and is positioned to carry objects between different levels in said automated storage system.

12. A closed loop vertical lift mechanism of claim 10 wherein said closed loop vertical system is mounted in an automated storage system and is positioned to hold objects indefinitely on its shelves.

13. A method of maintaining a moving crank member having offset first and second opposed ends substantially parallel to a fixed reference plane, comprising the steps of:
pivotally mounting said moving crank member at said first opposed end along a first axis;
pivotally mounting said moving crank member at said second opposed end along a second axis, said first and second axes extending substantially parallel to one another and spaced apart a distance; said first and second axes together defining a crank plane;
moving said moving crank member around a closed path by driving said first end of said crank member along a first endless loop at a predetermined rate, and driving said second end of said crank member along a second endless loop at about said predetermined rate, said first and second endless loops being substantial duplicates of one another positioned parallel to and offset and spaced apart from one another, wherein said crank plane remains substantially parallel to the fixed reference plane as said moving crank member moves along said closed path, each of said first and second loops including a continuous gear chain having a plurality of pivotally connected rigid links, each of said pivotally connected rigid links including internally facing linear gear teeth and an externally projecting carriage member, each said carriage member being adapted to pivotally engage a said opposed end;
a drive mechanism drivingly associated with said first and second carriage members, said drive mechanism including at least one drive gear adapted to drivingly engage said internally facing linear gear teeth; and
at least one carryover plate adapted to slidably support said pivotally connected rigid links as said pivotally connected rigid links transition from moving in one direction to moving in a generally opposed direction along said endless loops.

14. A moving crank member having offset first and second opposed ends, said moving crank member being moveable while maintaining a substantially parallel relationship to a fixed reference plane, said moving crank member comprising:

said moving crank member being pivotally mounted at said first opposed end along a first axis;

said moving crank member being pivotally mounted at said second opposed end along a second axis, said first and second axes extending substantially parallel to one another and spaced apart a distance; said first and second axes together defining a crank plane;

a driving assembly drivingly associated with said moving crank member, said driving assembly being mounted to drive said moving crank member around a substantially vertically oriented closed path with substantially straight reaches joined by arcuate transition portions while maintaining said crank plane substantially parallel to a fixed reference plane, said moving crank member being pivotally mounted to at least one continuous gear chain having a plurality of pivotally connected rigid links, said continuous gear chain including a carriage member integral with a said rigid link, said carriage member being pivotally associated with said moving crank member;

a shelf member mounted to said moving crank member; and a shelf stabilizing mechanism, said shelf stabilizing mechanism including stabilizing elements positioned to stabilizingly inter engage on said straight reaches of said closed path, and to disengage on said arcuate transition portions of said closed path.

15. A moving crank member of claim 14 wherein said moving crank member is adapted to move generally intermittently along said closed path, and said moving crank member is mounted in a two way high speed storage system between a conveyor and a reciprocating shuttle with said moving crank member being adapted to carrying objects substantially vertically between said conveyor and said reciprocating shuttle.

16. A moving crank member of claim 15 including a plurality of moving crank members in a vertical lift, said moving crank members being substantially evenly spaced about said closed path, said vertical lift being the only vertical lift between said conveyor and said shuttle.

* * * * *